United States Patent Office.

IMPROVEMENT IN PAINTS AND IN COATING WOOD, STONE, &c.

WILLIAM COGGESHALL, OF SPRINGFIELD, OHIO.

Letters Patent No. 60,478, dated December 18, 1866.

*The Schedule referred to in these Letters Patent and making part of the same.*

TO ALL WHOM IT MAY CONCERN:

Be it known that I, WILLIAM COGGESHALL, of Springfield, in the county of Clark, and State of Ohio, have invented a new and useful Improvement in Paints, and compositions for coating substances for analogous purposes; and I do hereby declare that the following is a full, clear, and exact description of the same.

The basis of this invention is a mineral substance, for which I know no name. The purest and best deposit of it with which I am acquainted is found on the land of one Mooney, in the county of Summit, and State of Ohio, near the Ætna mills, in the town of Akron, the county seat of said county. When taken from the earth and dried, it appears as a very fine powder, of a lead color, and requires no preparation for use except drying and sifting to extract any foreign and coarser substances that may be mingled with it. The following is the result of a chemical analysis made from a specimen taken from said bed, another specimen being filed with this application. The same article may be found in other parts of said county. I am not aware of its existence elsewhere.

In 1,010 parts—

| | |
|---|---|
| Bituminous vegetable matter and moisture | 154 |
| Silica and insoluble silicates | 550 |
| Alumina and peroxide of iron | 110 |
| Lime as carbonate | 75 |
| Magnesia | 90 |
| Salts soluble in water, as sulphate of lime and chloride of sodium | 30 |
| Loss | 1 |
| | 1,010 |

I refer to this bed as containing the best deposit within my knowledge, but I do not limit my claim to the precise deposit here mentioned, but I claim the use of similar earths of substantially the same composition, however produced, when used in the manner I shall proceed to describe. For want of a common name I shall call the material mentioned Coggeshall's Crude Article for Mineral Paints.

In applying this crude article, I first coat the substance intended to be protected with linseed oil, varnish, the variety of petroleum known as "lubricating oil," (first prepared by neutralizing the acid found as an ingredient in such oil by the use of an alkali,) coal tar, or any similar substance used in the manufacture of paints and compositions for covering various substances of an analogous nature. Over the surface thus prepared, the "crude article" is scattered by sifting, blowing, or in other convenient manner. It immediately becomes incorporated with such coating and dries with a hard, smooth surface, that soon hardens so as to be impervious to water, heat, or other ordinary agencies to which it is exposed. Successive coatings may be applied until the proper and desired thickness is obtained. The material may thus be used as a ground upon which other paints may be applied, or for coating roofs, floors, the decks of vessels, or other similar uses where a hard and durable coating is desired. It may be used as a paint by mixing with it dry any dry coloring matter, and applying the mixture in the manner described. By this means I am enabled to produce permanent colors, embodied in a hard and enduring enamel, capable of resisting all ordinary exposure for a long time.

What I claim as my invention is not broadly the use of this article in the compounding of paints, for I have myself used it for that purpose in the manufacture of paint; but what I do claim, and desire to secure by Letters Patent, is—

1. The method herein described for coating substances, by the application dry to properly prepared surfaces of the hereinbefore-described crude article, or any equivalent compound, substantially as set forth.

2. The use of the aforesaid crude article, or any equivalent substance, in combination with any coloring matter when applied dry, substantially in the manner set forth.

In testimony whereof I have signed my name to this specification in the presence of two subscribing witnesses.

WM. COGGESHALL.

Witnesses:
R. MASON,
JOHN S. HOLLINGSHEAD.